Figure 1:
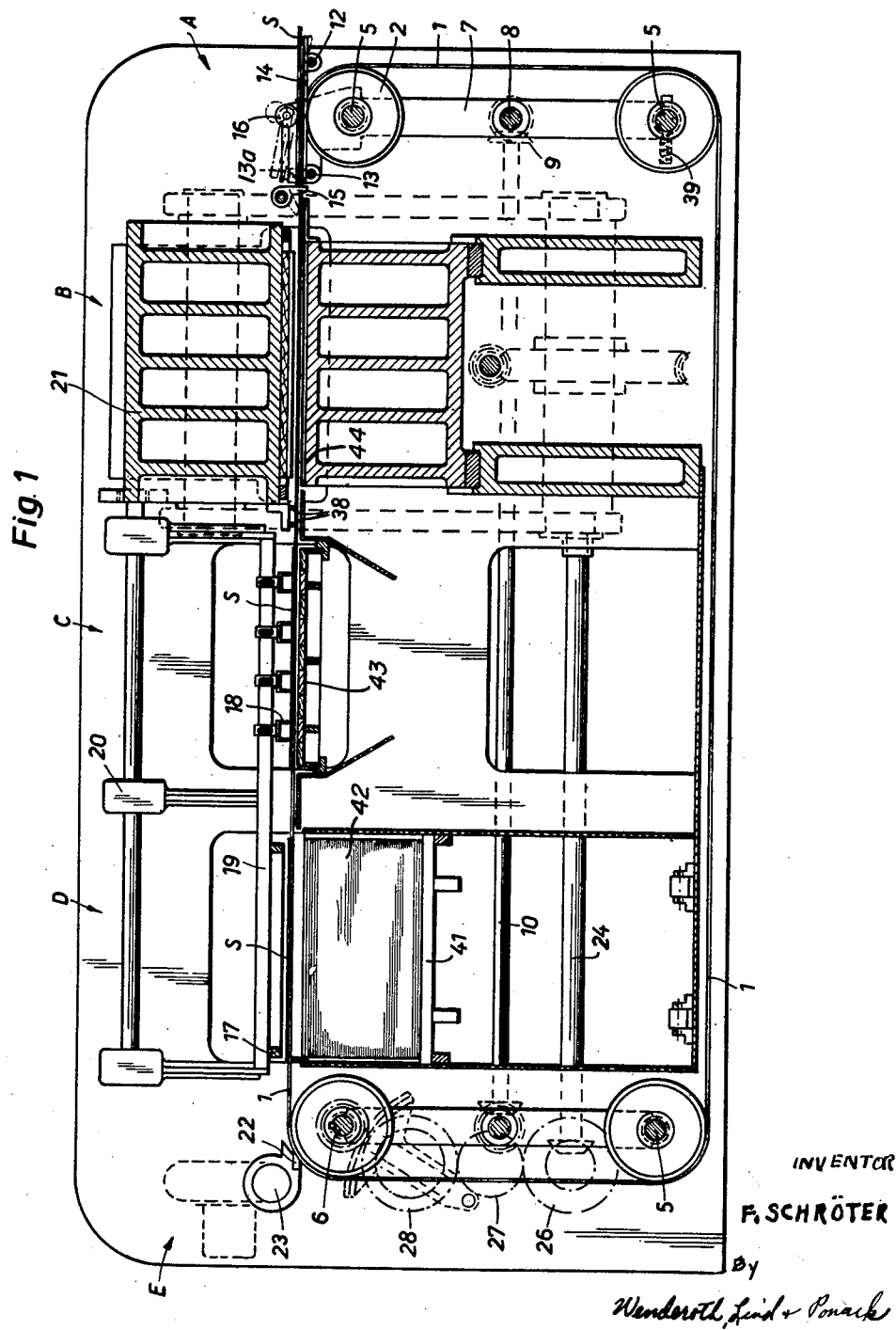

Feb. 2, 1965  F. SCHRÖTER  3,167,988
CONVEYOR MEANS FOR SHEET AND STRIP
MATERIAL PUNCHING APPARATUS
Filed June 1, 1959  3 Sheets-Sheet 1

INVENTOR
F. SCHRÖTER
By
Wenderoth, Lind & Ponack
Attys.

INVENTOR
F. SCHRÖTER

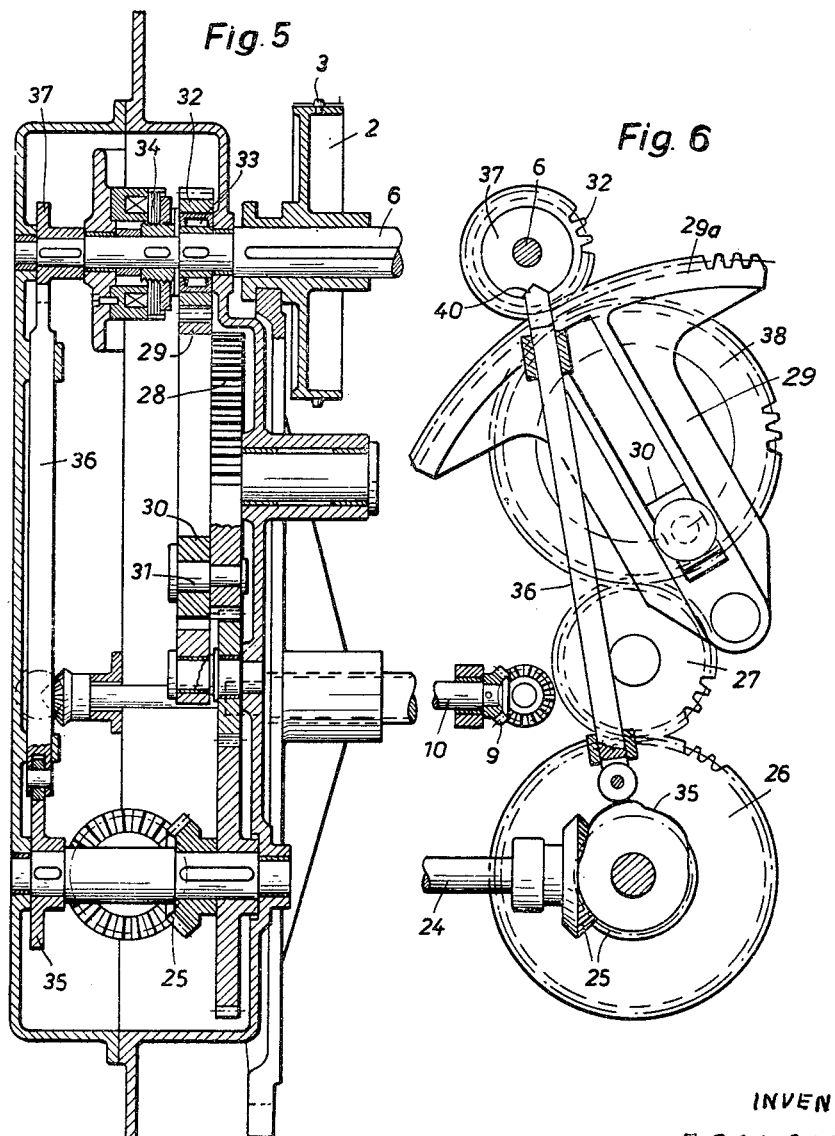

United States Patent Office 3,167,988
Patented Feb. 2, 1965

3,167,988
CONVEYOR MEANS FOR SHEET AND STRIP MATERIAL PUNCHING APPARATUS
Friedrich Schröter, Hannover, Germany
(Am Waldchen 8, Isernhagen NB Sud, Germany)
Filed June 1, 1959, Ser. No. 817,266
Claims priority, application Germany, June 2, 1958,
Sch 24,172
3 Claims. (Cl. 83—422)

The present invention relates to punching and embossing machines for paper and cardboard.

In punching machines operating according to the platen principle, the material is automatically fed to and from the operating stations according to various manners generally known.

The use of reciprocating elements having mutually controlled gripping members for the intermittent transport of sheets of material is known. Simple chain drives having abutting rods for inserting said sheets into bridge punching machines have also been previously employed. For the same purpose, it has been proposed to clamp the sheets between pairs of travelling belts pressed against each other for carrying them to the operating stations.

Recently high speed automatic punching machines have been equipped with conveyor devices, in which the sheet is carried along by means of gripping rods which are rigidly connected to two revolving endless chains and intermittently moved by the latter.

In order to avoid the accelerating and decelerating forces of an interruptedly moving chain system, a method has been recently developed, according to which the gripping rods are engaged with and disengaged from endless travelling chains for the purpose of transporting the material to, and stopping it at, the operating stations, the gripping rods being accelerated by kinematic means until obtaining chain velocity or decelerated down to the position of rest.

The use of such gripping rods provided between endless traction members has given satisfactory results within certain limits of machine speed and working size. Beyond these limits, difficulties with respect to dimensioning the gripping rods result from the mutually influencing action of increasing operating speed and size of the machine, since on the one hand the centrifugal forces of the gripping rods in passing through curved path sections rise in square power with increase in speed, while on the other hand the required moment of resistance of the gripping rods against deflection also increases with the square of the increasing bending length.

When using gripping rods an additional limitation with respect to any increase in operating speed and working size consists in that the sheets to be moved are engaged by the rods only at their front edge. With a low surface stiffness of the material to be worked and with an increasing deceleration down to position of rest, the risk increases that the inertia of the sheet of punching material pushes the rearward portions thereof along towards the gripping rods and thereby causes an uneven position of the sheet in the operating station.

The more an increase in operating speeds and larger working sizes require an increase of the moment of resistance and thus of the cross-sectional area, mainly the thickness of the gripping rods, the greater must be the stroke of the platens, relatively to each other, between which the movement of the gripping rods takes place. With regard to the most favourable conditions between movement and pressure, however, the punching platens should effect the shortest possible stroke.

It is an object of the present invention to obtain advantageous stroke conditions and to avoid the above mentioned limitations with respect to operating speed and size of automatic punching and embossing machines.

According to the invention the sheets of material to be conveyed or a continuous web of material shall be attached with both lateral edges each to an endless travelling conveyor belt to be brought to the operating stations of the machine by the intermittent feeding action of the belts and retained in position of rest during the operating steps. Needles, the points of which project beyond the outer surface of the conveyor belts, may for instance be used for attaching the edges of the sheet or web on both sides thereof to said belts. As an alternative, said sheets or web may be secured by means of an adhesive applied to the belts.

As compared with known methods, the method according to the invention offers the following advantages:

Possibility of higher operating speeds of the machine by a substantial reduction of the masses which are to be periodically accelerated or decelerated during the intermittent forward feeding movement;

Possibility of higher operating speeds and larger sizes of material to be punched by providing an improved positive guide movement retaining means for the sheets or webs of material;

Improved possibility for the punching scraps to break out and for depositing the stampings freed from scraps by breaking them out of the frame-shaped waste piece adhering to the conveying belts;

Most favourable conditions between movement and pressure during the punching and embossing operation owing to the extremely small stroke between the platens, which stroke has to permit the passage of the two thin conveying belts and the sheets or webs of material only.

Figure 2:
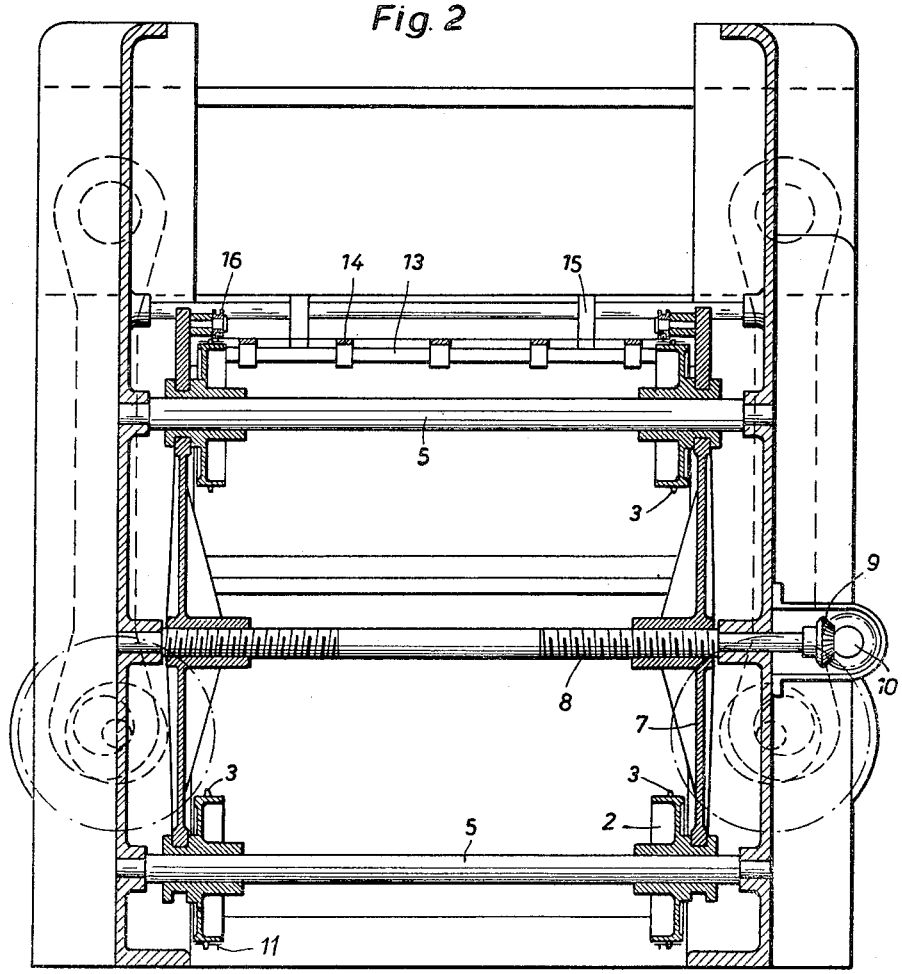
Figure 3:
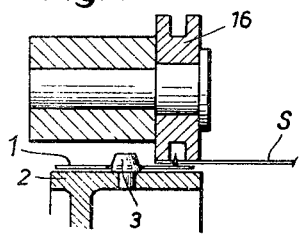
Figure 4:
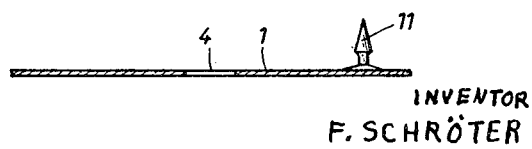

The present invention will now be described in more detail with reference to the accompanying drawings illustrating by way of example a preferred embodiment of the invention, and in which:

FIGURE 1 diagrammatically shows a longitudinal sectional view of an automatic punching machine according to the invention, FIGURE 2 is a transverse section through the machine at the point where the material is introduced, FIGURE 3 shows a detail of FIGURE 2, drawn to a larger scale, FIGURE 4 is a longitudinal section of a portion of a conveying belt, FIGURES 5 and 6 show in a vertical section and a view in elevation, respectively, a driving arrangement for the intermittent movement of the revolving endless conveying belts.

The automatic punching machine as illustrated in FIGURE 1 comprises the following sections in successive arrangement from the right to the left hand end: material introduction A, punching device B, break out device C, material deposit D, and stacking E. Two endless, parallel belts 1 of steel or any other suitable material travel about the guiding disks 2 mounted in pairs each on a shaft 5 or 6, and past the various operating stations of the machine. The periphery of the guiding disks 2 is provided with projections 3 (FIGURE 2), which engage like gear teeth into holes 4 of the belts 1 and thereby effect positive driving and guiding of the belts. The guiding disks 2 are axially movable on the shafts 5 and 6. By means of arms 7 which can be moved towards and away from each other by setting spindles 8, the spacing of the opposite disks of the pairs of disks 2 can be adjusted. The setting spindles 8 are interconnected by means of bevel gears 9 and a shaft 10, so that by rotation of the shaft 10 the spacing of all disk pairs 2 and thus the distance between the two parallel belts 1 can be adjusted in conformity with the width of the punching material.

In order to attach the two lateral edges of the sheets to be fed or of the travelling web to the conveying belts, the drawings show the endless belts 1 provided with needles 11 in longitudinally spaced relation, the points of which project from the outwardly directed face of the belts. Said needles each have an enlarged head 11a and a narrow waist portion 11b.

The sheets to be fed are supplied by means of an apparatus, not shown, to the punching machine. A feed table of the machine comprises two traverse shafts 12, 13 carrying a number of longitudinal rods 14 which are movable transversely of the machine, in order to adjust the width of the supporting surface. For feeding a sheet the table formed by the rods 14 is raised by pivoting the traversing member 13 about the shaft 12, the shaft 13 moving along curved slot 13a, so that the sheet strikes against the front marking 15 and will thereby be aligned. While the belts 1 remain at standstill, the feed table is then lowered, whereby the lateral edges of the sheets S are forced against the belts fitted with needles to the extent as the latter are already located underneath. After the marking member 15 has been turned away, the travelling movement of the belts 1 starts, the latter carrying the sheets of material along, whereby the final needling of the sheet edges is effected up to the rear edge of the sheet located between the guiding disks 2 and the pressure rolls 16.

The sheet of material S which is attached in the described manner to the transporting belts on both sides then passes intermittently to the operation stations until reaching the discharge end of the machine. Here the punched stamping is pressed out of the waste frame section, which remains adhering to the conveying belts by the pressure strips 17. In the example shown, these pressure strips 17 and the tools 18 of a scrap break-out station are secured to common rails 19, which effect a stroke by the action of suitable driving members 20, this stroke being initiated by the motion of the upper punching platen 21 and simultaneously takes place with the movement of the latter.

The frame waste, still adhering to the conveying belts after the stampings have been deposited on a support 41 is advanced to the stripper means 22, then stripped off by the latter and removed by a suction head 23.

As example for an intermittent drive of the conveying belts 1, a mechanical feed gearing is illustrated in FIGURES 5 and 6 of the drawings. This gearing comprises a drive shaft 24, a pair of bevel gears 25, spur gears 26, 27 and 28, a slotted crank member 29 having a swinging or oscillating gear segment 29a, and a slide block 30 moving in the slot. A crank pin 31 which is inserted in the spur gear wheel 28, is carried by the slide 30. The pinion 32 which engages the gear segment 29a effects one complete revolution for each swinging stroke of the crank member 29. Due to the fact that the pinion 32 is mounted on the shaft 6 about a free wheel 33, only the slower stroke of the crank member in one direction is utilized for the movement of rotation of the shaft 5 while the faster stroke of the crank member in the opposite direction and of shorter duration is made ineffective by the free wheel device for the purpose of stopping the shaft 6. While the pinion 32 reverses its direction of rotation, the shaft 6 is held stationary by the magnetic brake 34 until the free wheel has released the pinion from its clamped position.

In order to bring the sheet to be punched into the exact position between the punching tools and to securely retain it in this position, the cam disk 35 first forces the register rod 36 with its wedge-shaped end 40 into a likewise wedge-shaped recess of a notched disk 37. After loosening this preliminary locking arrangement between register rod 36 and notched disk 37, the final precise alignment of the sheet for the punching operation is effected by means of alignment pins 38, which are provided on the movable upper platen 21 and engage in the holes 4 of the belts 1. This double alignment of the sheet is necessary for compensating the stretching of the conveyor belts, which is unavoidable after having operated the machine for some time and a slight longitudinal displacement of said belts due to a deflection from their movement path caused by the punching operation.

A cycle of operations of the apparatus consists of a longer time-period I, which is utilized for the feeding movement of the material to be treated, and a shorter time-period II, in which the material remains stationary and can be treated.

The movement of the upper-punching plate 21 is synchronised so that it arrives approximately at the lower dead-center in the middle of the time-period II. Simultaneously, the scrap break-out tools 18 and the frame-shaped pressure-strips 17 operated by intermediate gears 20 also by the movement of the upper table, arrive at their lowest position.

The movement of the transverse-shaft 13 is so controlled that the lowering and tacking of the sheet previously adjusted on the front marking 15 is effected shortly before the feeding movement of the parallel belts 1 commences. Then the front marking is tilted upwardly, and afterwards the feeding movement of the parallel belts 1 is started.

At this moment the upper punching plate 21, scrap break-out tools 18, and the pressure-strips 17 have completed substantially one half of their upward stroke, and thereby sufficient space is obtained for the transport of the sheet to the next station (i.e. from A to B, B to C, and C to D).

When the parallel belts have effected one feeding step, all the sheets in the machine have been transported to the next following station; simultaneously a new sheet has reached the front marking at the station A. The upper punching plate 21, the scrap break-out tools 18 and the pressure-strips 17 have completed approximately one half of their downward stroke.

During the further course of the downward stroke, the scrap break-out tools 18 arrive first of all at the sheet in the break-out device or station C, and push the scrap present within the sheet through openings in the plywood break-out plate 43. Shortly afterwards, the pressure-strips 17 arrive on the sheet in the material deposit station D and push the workpieces (blanks) out of the frame-shaped scrap, which forms the outer edge of the sheet. The workpieces (blanks) fall flat onto the delivery pile 42 on plate 41.

Exactly at lower dead-center the cutting edges of the die meet the cutting plate 44 made of tempered steel and cut the workpieces (blanks) out of the sheet in the punching device B. The cohesion of the sheet for the remainder of the transport, is secured by a few narrow gaps in the knives.

The upward stroke now commences. After completion of one half of the stroke towards the upper dead-center position, the next feeding step of the parallel belts 1 begins. All sheets are transported one station further. During the movement thereof, the remainder of the frame-shaped rim scrap on the parallel belts 1 in the material deposit D, is lifted off the needles 11 by the stripping means 22 and removed by the suction head 23.

If, instead of individual sheets, a web is to be treated, then a web-section having the length of a feeding-step is substituted for a sheet. The front marking 15 becomes superfluous, and can be removed.

In order to maintain a uniform belt tension, springs 39 are provided which act upon one or more of the shafts 5 supporting the guiding disks 3.

What I claim is:

1. An apparatus for punching and embossing sheet and web-shaped paper material, comprising means for feeding said material, a single pair of laterally spaced intermittently movable endless conveyor belts, belt adjusting means on which said belts are mounted for adjusting the belts toward and away from each other, a punching press having punch supporting means adapted to removably support cutting means of various sizes and material supporting means opposed to said punch supporting means, which support means are spaced from each other a distance only slightly greater than the thickness of the material and said belts when said cutting means are in cutting relationship with said material, said belts at least when they are in positions closest to each other running between said opposed supporting means, tacking means consisting of means on said belts having a height which together with the thickness of said belts is less than the spacing between said supporting means when said cutting means are in cutting relationship with said material, said tacking means being for tacking the paper material to said belts adjacent the side edges thereof sufficiently securely to resist the lifting forces generated by the paper material and the operation of the apparatus tending to lift the paper material from the belts, means for pressing the material against said tacking means at the point where the tacking means enter the apparatus, and means for stripping the tacked portions of the paper material from the tacking means at the point where the tacking means leave the apparatus, whereby cooperating cutting means of different dimensions laterally of the direction of movement of said belts can be placed in said punch supporting means and said belts can be adjusted toward and away from each other and run between said supporting means without being touched by said supporting means during a punching operation.

2. In an apparatus for punching and embossing sheet and web-shaped paper material, said apparatus having means for feeding the material, means for pressing the material against conveying belts, and means for stripping the paper material from the conveying belts, the combination of a single pair of laterally spaced intermittently movable endless conveyor belts, belt adjusting means on which said belts are mounted for adjusting the belts toward and away from each other, a punching press having punch supporting means adapted to removably support cutting means of various sizes and material supporting means opposed to said punch supporting means, which supporting means are spaced from each other a distance only slightly greater than the thickness of the material and said belts when said cutting means are in cutting relationship with said material, said belts at least when they are in positions closest to each other running between said opposed supporting means, tacking means consisting of means on said belts having a height which together with the thickness of said belts is less than the spacing between said supporting means when said cutting means are in cutting relationship with said material, said tacking means being for tacking the paper material to said belts adjacent the side edges thereof sufficiently securely to resist the lifting forces generated by the paper material and the operation of the apparatus tending to lift the paper material from the belts, whereby cooperating cutting means of different dimensions laterally of the direction of movement of said belts can be placed in said punch supporting means and said belts can be adjusted toward and away from each other and run between said supporting means without being touched by said supporting means during a punching operation.

3. An apparatus as claimed in claim 2 in which said tacking means comprises a plurality of spaced pointed projections along the edges of said belts and having an enlarged head and a narrow waist portion.

References Cited by the Examiner
UNITED STATES PATENTS

| | | | |
|---|---|---|---|
| 2,096,268 | 10/37 | Towne | 83—404 |
| 2,158,053 | 5/39 | Bobst | 83—103 |
| 2,375,717 | 5/45 | Winkel | 83—278 |
| 2,568,028 | 9/51 | Redmond | 83—278 |
| 2,705,533 | 4/55 | Sasse | 83—404 |
| 2,724,254 | 11/55 | Zanger | 226—74 |
| 2,830,661 | 4/58 | Trostel | 83—35 |
| 2,850,090 | 9/58 | Biel | 83—35 |
| 2,961,137 | 11/60 | Menkel | 226—53 |

FOREIGN PATENTS 305,132   2/55   Switzerland.

ANDREW R. JUHASZ, *Primary Examiner.*

ARTHUR B. MILLER, CARL W. TOMLIN, *Examiners.*